United States Patent Office 3,307,057
Patented Feb. 28, 1967

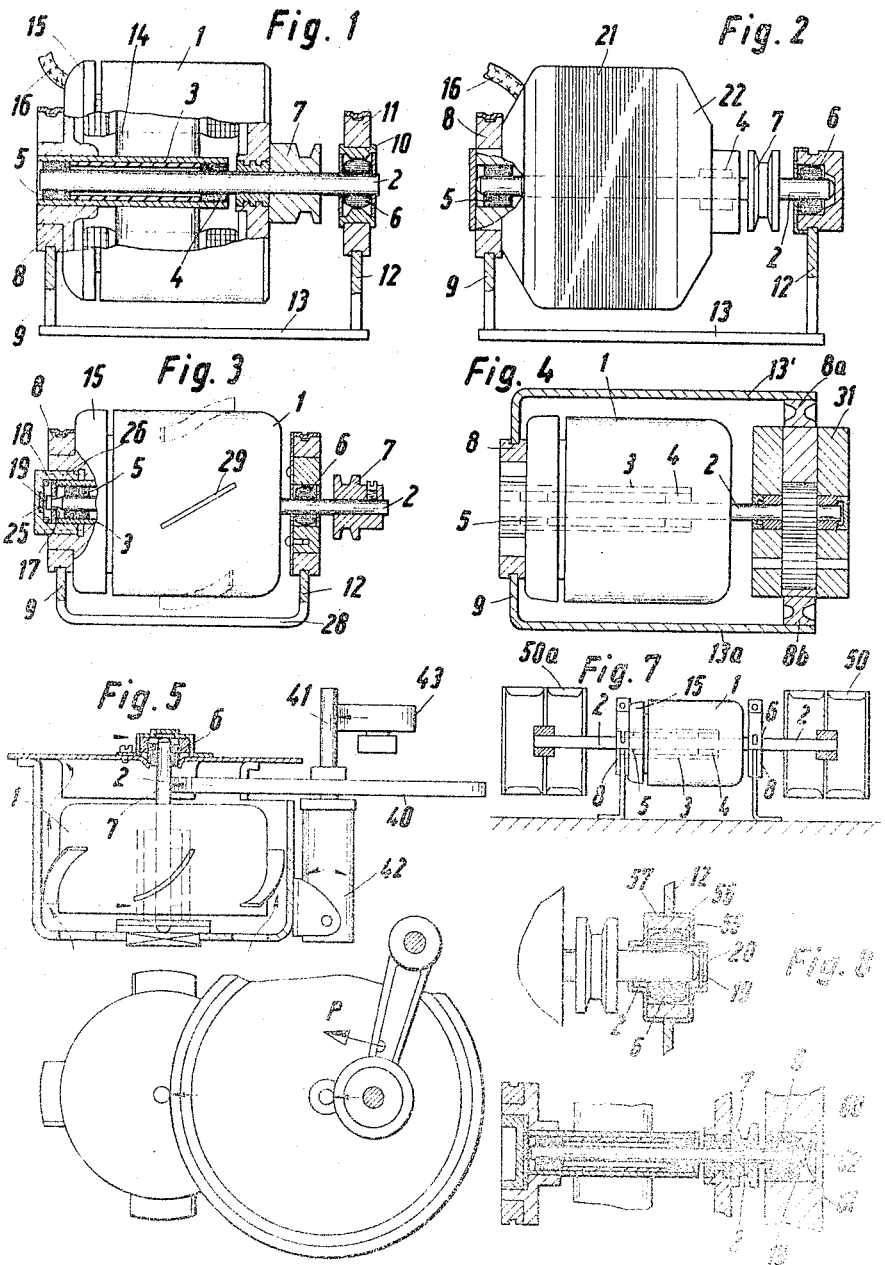

3,307,057
ELECTRIC MOTOR AND BEARING SUPPORT
Hermann Papst, St. Georgen, Black Forest, Germany
Filed May 19, 1964, Ser. No. 368,556
11 Claims. (Cl. 310—90)

The present invention relates to electric motors and is especially concerned to new and useful means for supporting the rotating shaft.

It has been found that hitherto in small electric motors the bearing friction absorbs a remarkable fraction of the total mechanical power produced and the requirements of low friction are only unsatisfactorily met by the known arrangements.

In small electric motors the rotor shaft has been supported at one end by means of a journal bearing closed at the end by a thrust surface. The driving force is then exerted between the bearing and the shaft. The total load on the bearing is thus equal to the sum of the drive load imposed by the associated drive and the weight of the rotor. It is a disadvantage of this arrangement that the widely separated bearings necessitate a very long shaft. Asymmetrically operating forces in the air gap therefore produce appreciable curvature of the shaft. These motors are strongly excited at the slot frequency when running near resonance and are therefore noisy.

Electric motors generally employed, on the other hand, have a small spacing of the bearings and freely projecting shaft ends, on which any required driving means may be fixed. This arrangement has, however, another disadvantage, in that the driving force substantially increases the bearing pressure through lever action. If, for example, the bearings are spaced twice as far apart as the distance between the plane of the driving belt and the nearest bearing, then the total bearing loading is almost twice as large as the driving force operating on the free-ended shaft. With the friction or belt drive, however, this is as a rule already some three times as large as the transmitted torque. The total bearing loading therefore amounts to many times the effective driving torque. With higher reductions, however, this latter increases inversely as the length of the lever arm is reduced.

In small motors the bearing loading due to the driving force may therefore become very noticeable as a reduction in speed. The bearing friction absorbs an appreciable fraction of the total mechanical power produced. The rubbing velocity of the shaft should be only small, since the diameter must be limited in view of the absolute necessity for reliable starting. In the alternating current motors usually employed it is in addition usual for the starting torque to be much less than the pull-out torque. In small motors, therefore, hydrodynamic separation of the friction surfaces is not as a rule produced. Low-wear sintered bearings, because of the porous bearing surfaces, also do not allow a hydrodynamic bearing film of lubricant to be produced. The bearings run practically without wear, however, since at even the least movement oil is provided through the pores directly to the sliding surfaces. The friction of the sintered bearing is therefore relatively high even when running. These reasons explain the considerable frictional component in the loading of small motors.

It is therefore a main object of this invention to provide a substantial improvement in the bearings and in the frictional conditions of small and miniature electric motors, especially those with sintered bearings.

It is a further object of this invention to provide an arrangement of the type mentioned which is comparatively simple in its structure and reliable in operation.

The starting point is that a substantial improvement can be produced in low-noise electric motors if the driving force can be carried by means independent of the means resisting the magnetic forces between rotor and stator. The increased bearing friction owing to the multiplication of the loading through lever action should therefore be reduced. In addition, even the substantially increased friction usual when such motors are operated in the vertical position should be avoided.

According to the present invention there is provided an electric motor drive apparatus in which the stator and rotor of an electric motor are mutually aligned by means of bearings spaced along a shaft carrying said motor, one end of said stator being resiliently mounted from a supporting member and that portion of said shaft which protrudes from the other end of said motor is carried in an additional bearing.

Preferably the additional bearing provided in accordance with the present invention is a self-aligning bearing. It may conveniently be carried by the apparatus to be driven by the motor.

Bearing arrangements in accordance with the present invention may be used with advantage both for motors with internal rotors and also for those with external rotors.

In very small electric motors, especially those with external rotors, of which the interior stators have only a small inertia, the usual arrangement of resisting the torque by two rubber vibration dampers is unsuitable.

It is therefore difficult to construct such a motor so as to be elastically yielding without making the supporting mounting unreliable, if a resonant frequency lying far below the excitation frequency, which is usually twice the mains frequency, is to be obtained in order to produce adequate decoupling. By the use of only one torque transmitting vibration damper, the resonant frequency of the system is lowered to some 70% of that with two elements, by the halving of the resilience. Since it is necessarily free for rotation the additional bearing provided in accordance with the invention cannot transmit any torque. With the additional bearing to resist the driving force, therefore, the decoupling of the transmission of rotary oscillations is substantially improved. A radially elastic bearing support may therefore be provided in order to reduce radial body noise due to an eccentric air-gap or the like.

The drive reaction force does not produce any appreciable curvature in the part of the shaft within the motor housing. With this arrangement of vibration-damper bearing, therefore, the shaft may be made relatively thin, since it is very little stressed in operation. This increases the moderate starting torque available from alternating-current motors with bearings of this kind.

The thinner shaft gives rise to less static friction.

Excessive bearing friction does not arise even with a high-reduction drive. Such thinner shafts may therefore without difficulty be constructed as a completely uniform strong cylinder. For mass-production such accurate and cheap shafts with high strength and long life may be made from roller-bearing needles.

It is recommended in carrying out the invention, in order to obtain a low-friction construction free from play and knock, to effect the endwise restriction of shaft movement by the end of a collar and one end surface of the shaft, or by both end surfaces of the shaft. For this purpose the shaft may be provided with a collar with a flat end surface, which bears against a divided or slotted thrust bearing disc. This is secured by the bearing cover to the bearing housing, the end of the shaft running on a thrust-bearing disc in the bearing cover.

The thrust bearing may also be formed by an elastic rubber ring, which is supported from the bearing cover with a conical ring engaging in a polished groove in the shaft.

The supporting bearing at the driving end of the shaft carries the driving load pressure to an extent inversely proportional to the separation of the outer bearings. The former double-ended lever action of the usual shaft arrangement and the increase of the loading of the motor bearing is thus done away with. The supporting bearing carries the main part of the driving force and a part of the weight of the motor, by which the motor bearing is loaded. The outer motor bearing is suitably arranged near the central plane of the vibration damper. A motor bearing closed at one end and the closed drive bearing running on the centre of the shaft end gives the minimum friction even when the motor runs with its shaft vertical.

It is further proposed to support the additional bearing or its housing directly from apparatus driven by the motor. This bearing may be arranged either to pivot about its centre or to be carried from hollow spherical surfaces. Since the driving load force operates always only on one side, the mounting of the drive support bearing may have a large amount of play. The magnetic forces then operate only on the motor bearings.

The drive support bearing, which transmits no rotary vibration may be arranged to be almost completely unyielding in the radial direction. This is particularly advantageous for friction drive mechanisms for record-player turntable drives and for audio tape recorders, in which yielding shafts cannot be employed owing to the resultant sound distortion.

The above-mentioned and other features and objects of this invention and the manner of attaining them will become more apparent and the invention itself will be best understood by reference to the following description of an embodiment of the invention taken in conjunction with the accompaying drawings, wherein:

FIGURE 1 is a longitudinal section through an external-rotor motor with an additional drive-supporting bearing at the end of the shaft and a belt pulley next to the motor casing, FIGURE 2 is a partly-sectional elevation of an internal-rotor motor with the driving end of the shaft supported by an additional bearing, FIGURE 3 is a partly-sectional elevation of an external-rotor motor with a drive-support bearing next to the motor casing and a freely accessible belt pulley, FIGURE 4 is a partly-sectional elevation of an external-rotor motor with a pump arranged on its shaft, of which the casing at the same time includes the additional supporting bearing, FIGURES 5 and 6 show respectively an elevation and a plan of a magnetic tape drive mechanism, in which the motor with a shaft supported at the top by an additional drive-support bearing is carried from the tape deck by a screening sheet-metal shell, FIGURE 7 shows a partly-sectional elevation of an external-rotor motor with a double centrifugal fan on each end of its shaft, FIGURE 8 shows a support bearing with a radial thrust bearing for both directions of thrust on one end of the shaft, and FIGURE 9 shows a partly-sectional elevation of a motor and supporting bearing with uni-directional thrust bearings on both ends of the shaft.

Referring now to the drawings, in which the same numerals identify like elements, in FIGURE 1 the bell-shaped external rotor 1 of an electric motor, mounted on a shaft 2, is partly supported by the bearings 4, 5 situated in the bearing tube 3. The rotor 1 may be of the type as disclosed in the U.S. Patent 3,002,118. The shaft 2 is also supported by an additional bearing 6, which may be adjusted by a small amount in all directions perpendicular to its mean plane. Between the bearing 6 and the motor casing 1 is disposed the driving member 7, for example a belt pulley, which may be coupled with the motor casing through a centrifugal clutch. The force exerted on the pulley 7 by the belt is then resisted mainly by support bearing 6 and in addition also by bearing 5. The flange 15 of the motor casing, which carries the bearing tube 3, has an outwardly projecting portion which is surrounded by an elastic rubber vibration damper 8, which in turn is supported by a rigid mounting member 9 so that the damper 8 forms resilient stator mounting means. Bearing 6 is situated in a rigid shell 10, which in turn is carried from a mounting member 12 by way of a rubber member 11. The mounting members 9 and 12 may form portions of a common base-member 13. Bearing tube 3 also carries the stator 14, the windings of which are connected with the main supply by way of connecting leads 16, running to a junction box on the flange 15.

In FIGURE 2 the casing 21 of an internal-rotor motor is, as in FIGURE 1, carried at the left-hand end from a supporting member 9 by means of an elastic rubber vibration damper 8, fitting over the motor casing in the region of the bearing 5, while the other bearing 4 is arranged in the end-shield 22. The belt pulley 7 is fastened on the shaft 2. The end of the shaft 2 protruding beyond the belt pulley 7 is carried in an additional support bearing 6. The remaining elements shown in FIGURE 2 have already been described in relation to FIGURE 1.

In FIGURE 3 the motor shaft 2 is carried by an additional bearing 6 in the vicinity of the external rotor casing 1, so that the belt pulley is overhung and may readily be replaced. The shaft 2 is axially located at the left-hand end near the bearing 5 by a special thrust bearing. For this purpose the shaft is provided with a flat end surface 17, which bears against a divided or slotted disc 18. The head of the shaft 2 bears against a disc 25 in the threaded cap 26. The threaded cap 26 is screwed into an internally threaded component which is secured to the bearing tube 3 in the flange 15. Parts 9 and 12 are portions of a trough-shaped shell 28, which may even completely enclose the motor, for example to protect it against abrasive dust, or as an auxiliary casing for conducting a flow of air, for which purpose inclined ribs 29 may be placed on the rotating motor casing 1. The shell may at the same time serve as a magnetic shield. The remaining parts correspond to those already described in connection with FIGURE 1.

In FIGURE 4 the external-rotor motor 1 with the shaft 2 is carried in the bearings 4 and 5 of the stator bearing tube 3. In addition the free end of shaft 2 is supported in the vicinity of the driven element, for example within the gear-pump 31. A vibration damper 8 fitted over the spigot on the casing in the vicinity of the bearing 5, with additional vibration dampers 8a, 8b, allows the shaft to run free from restraint. A mounting bracket 9, 13′, 13a connects the rubber members together to form a common mounting. In this manner a simple drive unit is obtained without the use of special shaft couplings.

In the tape-recorder drive mechanism illustrated by FIGURES 5 and 6 an external-rotor motor 1 has a shaft 2 supported in a special bearing 6 in the neighborhood of the end 7 of the shaft which serves as a friction wheel engaging with a friction disc 40 carried on a shaft 41 which serves as a tape capstan. Shaft 41 is mounted for rotation in a hinged bearing 42 so that only when a tape to be transported is pressed against it by pressure applied as indicated by arrow P in FIGURE 6 to a hinged arm carrying a pressure roller 43 does disc 40 exert lateral pressure against motor shaft 2. This lateral pressure is then resisted by bearing 6.

FIGURE 7 shows an external-rotor motor 1 having a shaft 2 protruding from the motor at both ends. The left-hand end of motor 1, that is, the stator flange 15, is supported in a vibration damper 8, while at the right-hand end the shaft 2 is supported in a bearing 6 also carried in a vibration damper 8. Fan runners 50, 50a are shown fitted to the right-hand and left-hand ends of shaft 2. The guide casings for these fans are not shown in the drawing. Such double fans are advantageously employed for silent air-conditioning when driven in the manner described by an external-rotor motor.

The additional bearing 6 used in electric motor drive apparatus according to the invention may advantageously be constructed as a ball-bearing with a self-adjusting feature provided by the use of a spherical outer ball-race. Such bearings are known as self-aligning bearings.

FIGURE 8 shows a suitable construction for the bearing 6 as a spherical bearing carried in a fixed ring 55, which is closed by two drawn shell-members 56 and 57. The shells 56, 57 provide room for the ring 55 to be received in the bearing support member 12. The head 14 of the shaft 2 again bears against a bearing disc 20 which takes up any axial thrust.

FIGURE 9 shows another arrangement of bearing similar to that of FIGURE 1, the bearing 6 being inserted in a capsule 60 of substantially spherical configuration in a blind bore 61 pre-formed in apparatus to be driven by the motor, and pressed against the head 19 of the shaft 2 by means of a spring 62 sandwiched between the capsule 60 and the end wall of the blind bore 61 to take up any axial thrust acting on the shaft 2. This bearing arrangement, with practically point-contact at the centre of the shaft, is characterized by substantially noiseless running, since the bearing 6 is made completely free from play by the spring 62, without substantial friction being produced. At the same time the rubbing velocity at this position is very small, so that no frictional noise is produced by contact between the rubbing surfaces. The capsule 60 is in contact with the interior of the bore 61 in the driven device over a narrow area in the mid-plane of the bearing 6.

The bearing 6 may also have considerable play in the bore 61, since the driving force upon the belt-pulley 7 always acts towards one side only and the bearing 6 has no effect in maintaining the spacing between stator and rotor. Bearing 6 is therefore always positioned completely free from restraint, in contrast to normal spherical bearings which may be disturbed from their correct adjustment by jolting in transit and then give rise to additional friction.

On assembling the motor with the apparatus to be driven the end of the motor shaft carrying the additional bearing 6 is inserted into the prepared bore in the apparatus and the motor secured by the vibration damper at its far end. In case of need, additional means may be provided to resist excessive shocks arising in transit.

The bearing arrangement in accordance with the present invention which has been described above provides electric motor drive apparatus of simple construction with antivibration mountings, good noise suppression and reduction of working friction.

What is claimed as new and desired to be secured by Letters Patent is:

1. Electric motor drive apparatus comprising, in combination, an electric motor including a stator assembly having an axis of symmetry; a pair of axially spaced bearing means carried by said stator assembly coaxial with said axis; a shaft turnably mounted in said bearing means; support means; resilient stator mounting means connecting one end of said stator assembly to said support means, said shaft projecting with a portion thereof beyond the other end of said stator assembly; a rotor coaxially secured to said projecting shaft portion in a region thereof adjacent to the other end of said stator assembly and projecting into the region of said stator assembly at least partially surrounding the same; and a self-aligning bearing means carried by said support means and turnably supporting said projecting shaft portion in a region thereof located outwardly from said region in which said rotor is secured to said projecting shaft portion.

2. Electric motor drive assembly as set forth in claim 1, wherein said additional bearing means includes axial thrust bearing means.

3. Electric motor drive assembly as set forth in claim 1, and including a drive member fixed to said projecting shaft portion.

4. Electric motor drive assembly as set forth in claim 3, wherein said drive member is closer to said other end of said stator assembly than said additional bearing means.

5. Electric motor drive assembly as set forth in claim 3, wherein said drive member is spaced farther from said other end of said stator assembly than said additional bearing means.

6. Electric motor drive assembly as set forth in claim 1, wherein said support means include additional apparatus to be driven by said motor, and wherein said additional bearing means is carried by said additional apparatus.

7. Electric motor drive assembly as set forth in claim 1, wherein said support means comprise a support member carrying said resilient stator mounting means and said additional bearing means.

8. Electric motor drive assembly as set forth in claim 1, wherein said additional bearing means is arranged to rock to a limited extent about its mean plane.

9. Electric motor drive assembly as set forth in claim 1, wherein said motor is an external-rotor motor, and wherein said stator assembly includes a flange in the region of said one end thereof, a tube secured to said flange, said pair of axially spaced bearing means being mounted in said tube.

10. Electric motor drive assembly as set forth in claim 1, and including a friction wheel engaging said shaft intermediate said rotor and said additional bearing means.

11. Electric motor drive apparatus according to claim 1, including a drive member fixed to said projecting shaft portion between said rotor carried by said shaft and said self-aligning bearing means supporting said projecting shaft portion.

References Cited by the Examiner

UNITED STATES PATENTS 2,047,838  7/1936  Smith _____ 310—51
3,154,705  10/1964  Essenburg _____ 310—51

MILTON O. HIRSHFIELD, *Primary Examiner.*

J. W. GIBBS, *Assistant Examiner.*